（12) United States Patent
Corma Canós et al.

(10) Patent No.: US 7,582,278 B2
(45) Date of Patent: Sep. 1, 2009

(54) MICROPOROUS CRYSTALLINE ZEOLITE MATERIAL, ZEOLITE ITQ-32, PREPARATION METHOD THEREOF AND USE OF SAME

(75) Inventors: Avelino Corma Canós, Avda. los Naranjos (ES); Ángel Cantín Sanz, Avda. los Naranjos (ES); Fernando Rey García, Avda. los Naranjos (ES); Susana Valencia Valencia, Avda. los Naranjos (ES); Sandra Leiva Herrero, Avda. los Naranjos (ES)

(73) Assignees: Consejo Superior de Investigaciones Cientificas, Valencia (ES); Universidad Politecnica de Valencia, Valencia (ES)

( * ) Notice: Subject to any disclaimer, the term of this patent is extended or adjusted under 35 U.S.C. 154(b) by 0 days.

(21) Appl. No.: 11/883,354

(22) PCT Filed: Jan. 26, 2006

(86) PCT No.: PCT/ES2006/070005

§ 371 (c)(1),
(2), (4) Date: Jul. 21, 2008

(87) PCT Pub. No.: WO2007/036589

PCT Pub. Date: Apr. 5, 2007

(65) Prior Publication Data
US 2009/0068092 A1    Mar. 12, 2009

(30) Foreign Application Priority Data
Feb. 2, 2005    (ES) .............................. 200500245

(51) Int. Cl.
C01B 39/46    (2006.01)
C01B 39/48    (2006.01)
(52) U.S. Cl. .............. 423/718; 423/335; 423/706; 423/709; 423/702; 423/708; 502/60; 502/62; 502/63; 502/73; 502/71

(58) Field of Classification Search ............ 423/335, 423/702, 706, 708, 709, 718; 502/60, 62, 502/63, 71, 73; C01B 39/46, 39/48
See application file for complete search history.

(56) References Cited

U.S. PATENT DOCUMENTS
4,100,262 A * 7/1978 Pelrine ................ 423/703

(Continued)

FOREIGN PATENT DOCUMENTS
ES    2 155 761    5/2001
WO    03/006376    1/2003

OTHER PUBLICATIONS

Angel Cantin et al., "Synthesis and Structure of the Bidimensional Zeolite ITQ-32 with Small and Large Pores", J. Am. Chem. Soc., vol. 127, pp. 11560-11561 (2005).

(Continued)

Primary Examiner—Melvin C Mayes
Assistant Examiner—Jun Li
(74) Attorney, Agent, or Firm—Wenderoth, Lind & Ponack, L.L.P.

(57) ABSTRACT

The invention relates to a microporous crystalline zeolite material which, in the calcined state and in the absence of defects in the crystalline lattice thereof, manifested by the presence of silanols, has empirical formula $x(M_{1/n}XO_2)$: $yYO_2:SiO_2$, in which M is selected from among H+, at least one inorganic cation with charge +n and a mixture of both; X is at least one chemical element in oxidation state +3; Y is at least one chemical element in oxidation state +4, which is different from Si, x has a value of between 0 and 0.2 inclusive, and y has a value of between 0 and 0.1 inclusive. In addition, as it is synthesised, and in the calcined state, the material has a characteristic X-ray diffraction pattern known as ITQ-32. The invention also relates to the method of preparing said material and to the use thereof.

33 Claims, 2 Drawing Sheets

U.S. PATENT DOCUMENTS

| | | | |
|---|---|---|---|
| 4,793,984 A * | 12/1988 | Lok et al. | 423/704 |
| 5,192,727 A * | 3/1993 | Nair et al. | 502/64 |
| 5,910,299 A * | 6/1999 | Carluccio et al. | 423/706 |
| 5,968,474 A * | 10/1999 | Nakagawa et al. | 423/706 |
| 6,652,831 B1 | 11/2003 | Villaescusa Alonso et al. | |
| 7,344,697 B2 * | 3/2008 | Corma Canos et al. | 423/718 |
| 2003/0180217 A1 * | 9/2003 | Canos et al. | 423/718 |
| 2004/0191167 A1 * | 9/2004 | Elomari | 423/706 |

OTHER PUBLICATIONS

David H. Olson et al., "*Light hydrocarbon sorption properties of pure silica Si-CHA and ITQ-3 and high silica ZSM-58*", Microporous and Mesoporous Materials, vol. 67, pp. 27-33 (2004).

* cited by examiner

MICROPOROUS CRYSTALLINE ZEOLITE MATERIAL, ZEOLITE ITQ-32, PREPARATION METHOD THEREOF AND USE OF SAME

FIELD OF THE ART

The present invention belongs to the technical field of microporous crystalline zeolite materials, useful as absorbents, catalysts or components of catalysts, for processes of transformation, adsorption and separation of organic compounds.

STATE OF THE ART

Zeolites are microporous crystalline materials formed by a lattice of $TO_4$ tetrahedra which share all their vertices giving rise to a three-dimensional structure containing channels and/or cavities of molecular dimensions. Their composition is variable and T generally represents atoms with a formal oxidation state of +3 or +4, for example Si, Ge, Ti, Al, B, Ga, . . . . When any of the T atoms have an oxidation state of less than +4, then the crystal lattice that is formed displays negative charges which are compensated by means of the presence of organic or inorganic cations in the channels or cavities. Said channels or cavities can also house organic molecules and $H_2O$ so that, in general, the chemical composition of the zeolites can be represented by means of the following empirical formula:

$$x(M_{1/n}XO_2):yYO_2:zR:wH_2O$$

where M is one or more organic or inorganic cations of charge +n; X is one or more trivalent elements; Y is one or more tetravalent elements, generally Si; and R is one or more organic substances. Although post-synthesis treatments can be used to alter the nature of M, X, Y and R and the values of x, y, z and w, the chemical composition of a zeolite (as synthesised or following its calcination) possess an interval that is characteristic of each zeolite and of its method of obtention.

The crystalline structure of each zeolite, with a specific system of channels and cavities, gives rise to a characteristic X-ray diffraction, which allows them to be differentiated from each other.

Many zeolites have been synthesised in the presence of an organic molecule which acts as a structure directing agent. Organic molecules acting as structure directing agents (SDA) generally contain nitrogen in their composition, and they can give rise to organic cations that are stable in the reaction medium.

The mobilisation of the precursor species during the synthesis of zeolites can be carried out in the presence of hydroxyl groups and basic medium, which can be introduced as the hydroxide of the SDA itself, such as for example tetrapropylammonium hydroxide in the case of zeolite ZSM-5. Fluoride ions can also act as mobilising agents in the synthesis of zeolites. For example, patent EP-A-337479 describes the use of HF in $H_2O$ at low pH as mobilising agent of the silica for the synthesis of zeolite ZSM-5.

DESCRIPTION OF THE INVENTION

The present invention relates to a novel microporous crystalline zeolite material, identified as "zeolite ITQ-32", and to the preparation method thereof. This material, both in its calcined state and synthesised without calcining, has an X ray diffraction pattern that is different from other known zeolite materials and is therefore characteristic of this material.

The present invention first of all relates to a microporous crystalline zeolite material which, in the calcined state and in the absence of defects in the crystal lattice thereof, manifested by the presence of silanols, has empirical formula $$x(M_{1/n}XO_2):yYO_2:SiO_2,$$

in which

M is selected from among H+, at least one inorganic cation with charge +n and a mixture of both;

X is at least one chemical element in oxidation state +3;

Y is at least one chemical element in oxidation state +4, which is different from Si, x takes a value of between 0 and 0.2 inclusive, y takes a value of between 0 and 0.1 inclusive, and in that the material, as it is synthesised, has a characteristic X-ray diffraction pattern with at least the values of 2θ (degrees) and relative intensities ($I/I_0$) shown in table I, where $I_0$ is the intensity of the strongest peak which is assigned a value of 100:

TABLE I

| 2θ (degrees) ± 0.5 | Intensity ($I/I_0$) |
|---|---|
| 7.3 | s |
| 8.8 | vs |
| 9.7 | w |
| 16.4 | w |
| 19.6 | s |
| 20.2 | s |
| 21.0 | s |
| 21.9 | s |
| 24.2 | m |
| 26.0 | m |
| 27.0 | m |
| 27.5 | m | where w is a weak relative intensity of between 0 and 20%, m is a medium relative intensity of between 20 and 40%, s is a strong relative intensity of between 40 and 60%, vs is a very strong relative intensity of between 60 and 100%, The microporous crystalline zeolite material according to the invention, after being calcined in order to eliminate the organic compounds occluded in its interior, possesses an X-ray diffraction pattern with at least the values of 2θ (degrees) and relative intensities ($I/I_0$) shown in table II:

TABLE II

| 2θ (degrees) ± 0.5 | Intensity ($I/I_0$) |
|---|---|
| 7.4 | vs |
| 8.9 | vs |
| 9.7 | w |
| 12.9 | w |
| 19.3 | w |
| 20.3 | m |
| 20.9 | m |
| 22.0 | m |
| 24.3 | w |
| 26.0 | w |
| 27.1 | m |
| 27.6 | w | where w, m, s, and vs has the above meaning.

The element X is preferably selected from among Al, Ga, B, Fe, Cr and mixtures of them.

The element Y is preferably selected from among Ge, Ti, Sn, V and mixtures of them.

In the above empirical formula, "x" takes a value preferably less than 0.1.

In the above empirical formula, "y" takes a value preferably less than 0.05.

According to a preferred embodiment of the present invention the microporous crystalline zeolite material ITQ-32, in the calcined state and in the absence of defects in the crystalline lattice thereof, manifested by the presence of silanols, has the empirical formula

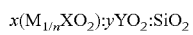

in which

M is selected from among H+, at least one inorganic cation with charge +n, preferably alkalines or alkaline-earths, alkaline metals, alkaline-earths and combination of them, X is at least one chemical element in oxidation state +3 selected from among Al, Ga, B, Fe, Cr and mixtures of them;

Y is at least one chemical element in oxidation state +4, different from Si, selected from among Ge, Ti, Sn, V and mixtures of them, x takes a value of between 0 and 0.1 inclusive, y takes a value of between 0 and 0.05 inclusive, and the material, as it is synthesised, has a characteristic X-ray diffraction pattern with at least the values of 2θ (degrees) and relative intensities $(I/I_0)$ mentioned above (table I) and said material in the calcined state has a characteristic X-ray diffraction pattern with at least the values of 2θ (degrees) and relative intensities $(I/I_0)$ mentioned above (table II).

According to an especially preferred embodiment of the present invention, the microporous crystalline zeolite material ITQ-32 is a pure silica material, in other words in the general formula stated above "x" and "y" take the value 0.

According to an additional especially preferred embodiment of the present invention, the microporous crystalline zeolite material ITQ-32 is a material in whose general formula X is Al or B and "y" takes the value 0.

According to an especially preferred embodiment of the present invention, the microporous crystalline zeolite material ITQ-32 is a material in whose general formula Y is Ti or Sn and "x" takes the value 0.

According to an especially preferred embodiment of the present invention, the microporous crystalline zeolite material ITQ-32 is a material in whose general formula X is Al or B and Y is Ti or Sn.

The X-ray diffraction patterns of the ITQ-32 material have been obtained by the powder method using a fixed divergence slit of 1/8° and employing Kα radiation from Cu. It has to be borne in mind that the diffraction data listed for this sample of zeolite ITQ-32 as single or individual lines can consist of multiple overlaps or superpositions of reflections which, under certain conditions, such as differences in crystallographic changes, can appear as resolved or partially resolved lines. In general, the crystallographic changes can include minor variations in the parameters of each unit cell and/or changes in the symmetry of the crystal, without any change in structure taking place. So, the positions, widths and relative intensities of the peaks depend to a certain measure on the chemical composition of the material, as well as on the degree of hydration and on the crystal size.

In particular, when the lattice is composed exclusively of silicon and aluminium oxides, with a molar ratio Si/Al=35 and it has been synthesised in the presence of fluoride anions using the quaternary ammonium cation N,N,N',N'-tetramethyl-decahydro-cyclobuta [1,2-c;3,4-c'] dipyrrolidinium as structure directing agent, then the zeolite ITQ-32 as synthesised displays an X-ray diffraction pattern as shown in FIG. 1. This diagram is characterised by the values of 2θ (degrees) and relative intensities $(I/I_0)$ that are presented in table III, where w, m, s and vs have the same meaning as in table I.

TABLE III

| 2θ (degrees) ± 0.5 | Intensity $(I/I_0)$ |
|---|---|
| 7.32 | s |
| 8.79 | vs |
| 9.75 | w |
| 12.92 | w |
| 13.66 | w |
| 14.68 | w |
| 16.40 | w |
| 19.59 | s |
| 20.21 | s |
| 20.38 | s |
| 20.80 | m |
| 20.97 | s |
| 21.94 | vs |
| 22.64 | w |
| 22.92 | w |
| 23.44 | w |
| 24.21 | m |
| 24.48 | w |
| 24.71 | w |
| 25.66 | w |
| 26.00 | s |
| 27.05 | m |
| 27.52 | w |
| 27.76 | w |
| 27.97 | w |
| 28.46 | w |
| 28.65 | w |
| 29.91 | w |
| 30.57 | w |
| 31.61 | w |
| 32.32 | w |
| 39.61 | w |
| 33.15 | w |
| 33.62 | w |
| 35.44 | w |
| 35.84 | w |
| 37.27 | w |
| 37.80 | w |
| 38.10 | w |
| 38.59 | w |
| 39.08 | w |

The X-ray diffraction pattern of the above sample of ITQ-32, after being calcined at 580° C. in order to eliminate the organic compounds occluded in its interior, is shown in FIG. 2. This diffactrogram is characterised by the values of 2θ (degrees) and relative intensities $(I/I_0)$ shown in table IV, where w, m, s, and vs have the same meaning as in table I. The comparison of the X-ray diffractograms corresponding to zeolite ITQ-32 as synthesised and in the calcined state provide evidence of the great thermal stability of the material.

TABLE IV

| 2θ (degrees) | Intensity $(I/I_0)$ |
|---|---|
| 7.36 | vs |
| 8.90 | vs |
| 9.74 | w |
| 12.26 | w |
| 12.94 | w |

TABLE IV-continued

| 2θ (degrees) | Intensity (I/I₀) |
|---|---|
| 13.70 | w |
| 14.89 | w |
| 15.68 | w |
| 16.11 | w |
| 16.39 | w |
| 19.52 | w |
| 19.66 | w |
| 20.25 | m |
| 20.41 | w |
| 20.92 | m |
| 21.96 | m |
| 22.94 | w |
| 23.41 | w |
| 24.26 | w |
| 24.50 | w |
| 24.70 | w |
| 25.58 | w |
| 26.02 | w |
| 27.07 | m |
| 27.57 | w |
| 27.94 | w |
| 28.51 | w |
| 28.69 | w |
| 29.88 | w |
| 30.42 | w |
| 31.57 | w |
| 32.23 | w |
| 33.09 | w |
| 33.59 | w |
| 35.35 | w |
| 35.82 | w |
| 37.37 | w |
| 37.70 | w |
| 38.55 | w |
| 39.11 | w |
| 39.66 | w |

Secondly the present invention relates to a method for synthesising the microporous crystalline material ITQ-32, characterised in that a reaction mixture containing at least:

one or more sources of $SiO_2$, one or more sources of organic cation R, one or more sources of fluoride ions, and water is subjected to heating at a temperature between 80 and 200° C. until its crystallisation is achieved, and in that the reaction mixture has a composition, in terms of molar ratios, lying in the intervals $ROH/SiO_2$=0.01-1.0, $F/SiO_2$=0.1-3.0, $H_2O/SiO_2$=1-50.

According to a particular embodiment of the method, a reaction mixture containing exclusively:

one or more sources of $SiO_2$, one or more sources of organic cation R, one or more sources of fluoride ions, and water is subjected to heating at a temperature between 80 and 200° C. until its crystallisation is achieved, and in that the reaction mixture has a composition, in terms of molar ratios, lying in the intervals $ROH/SiO_2$=0.01-1.0, $F/SiO_2$=0.1-3.0, and $H_2O/SiO_2$=1-50.

According to an additional particular embodiment of the method, the reaction mixture furthermore contains:

a source of one or more trivalent elements X, and has a composition, in terms of molar ratios, lying in the intervals $ROH/SiO_2$=0.01-1.0, $X_2O_3/SiO_2$=0-0.1, excluding the value 0

$F/SiO_2$=0.1-3.0, and $H_2O/SiO_2$=1-50.

According to an additional particular embodiment of the method, the reaction mixture furthermore contains:

a source of one or more tetravalent elements Y, different from Si, and has a composition, in terms of molar ratios, lying in the intervals $ROH/SiO_2$=0.01-1.0, $YO_2/SiO_2$=0-0.1, excluding the value 0

$F/SiO_2$=0.1-3.0, and $H_2O/SiO_2$=1-50.

According to an additional particular embodiment of the method, the reaction mixture furthermore contains:

a source of one or more tetravalent elements Y different from Si, a source of one or more trivalent elements X, and has a composition, in terms of molar ratios, lying in the intervals $ROH/SiO_2$=0.01-1.0, $X_2O_3/SiO_2$=0-0.1, excluding the value 0

$YO_2/SiO_2$=0-0.1, excluding the value 0

$F/SiO_2$=0.1-3.0, and $H_2O/SiO_2$=1-50.

According to an additional particular embodiment of the method, the reaction mixture contains:

a source of $SiO_2$, a source of one or other tetravalent elements Y, different from Si, selected from among Ge, Ti, V, Sn and mixtures of them, a source of one or other triavalent elements X selected from among Al, B, Ga, Fe, Cr and mixtures of them, a source of inorganic cations M of charge +n, selected from among H+, at least one inorganic cation of charge +n selected from among, alkaline metals, alkaline-earths and combination of them, one or more sources of organic cation R, selected from between N,N,N',N'-tetramethyl-decahydro-cyclobuta [1,2-c; 3,4-c'] dipyrrolidinium and 4-cyclohexyl-1,1-dimethyl-piperazinium, a source of fluoride ions, and water is subjected to heating with or without stirring at a temperature between 80 and 200° C. until its crystallisation is achieved, and in that the reaction mixture has a composition, in terms of molar ratios, lying in the intervals $ROH/SiO_2$=0.01-1.0, $M_{1/n}OH/SiO_2$=0-1.0, excluding the value 0, $X_2O_3/SiO_2$=0-0.1, excluding the value 0, $YO_2/SiO_2$=0-0.1, excluding the value 0, $F/SiO_2$=0.1-3.0, and $H_2O/SiO_2$=1-50.

According to a preferred particular embodiment of the method, the reaction mixture contains:

a source of $SiO_2$, a source of one or other tetravalent elements Y, different from Si, selected from among Ge, Ti, V, Sn and mixtures of them, a source of one or other triavalent elements X selected from among Al, B, Ga, Fe, Cr and mixtures of them, one or more sources of organic cation R, selected from between N,N,N',N'-tetramethyl-decahydro-cyclobuta [1,2-c; 3,4-c'] dipyrrolidinium and 4-cyclohexyl-1,1-dimethyl-piperazinium, a source of fluoride ions, and water is subjected to heating with or without stirring at a temperature between 80 and 200° C. until its crystallisation is achieved, and in that the reaction mixture has a composition, in terms of molar ratios, lying in the intervals $ROH/SiO_2=0.1-1.0$
$X_2O_3/SiO_2=0-0.05$, excluding the value 0
$YO_2/SiO_2=0-0.05$, excluding the value 0
$F/SiO_2=0.1-2.0$
$H_2O/SiO_2=1-20$.

According to a preferred particular embodiment of the method, the reaction mixture contains:

a source of $SiO_2$, one or more sources of organic cation R, selected from between N,N,N',N'-tetramethyl-decahydro-cyclobuta [1,2-c; 3,4-c'] dipyrrolidinium and 4-cyclohexyl-1,1-dimethyl-piperazinium, a source of fluoride ions, and water is subjected to heating with or without stirring at a temperature between 80 and 200° C. until its crystallisation is achieved, and in that the reaction mixture has a composition, in terms of molar ratios, lying in the intervals $ROH/SiO_2=0.01-1.0$
$F/SiO_2=0.1-3.0$,
$H_2O/SiO_2=1-50$.

According to a preferred particular embodiment of the method, the reaction mixture contains:

a source of $SiO_2$, one or more sources of organic cation R, selected from between N,N,N',N'-tetramethyl-decahydro-cyclobuta [1,2-c; 3,4-c'] dipyrrolidinium and 4-cyclohexyl-1,1-dimethyl-piperazinium, a source of fluoride ions, and water is subjected to heating with or without stirring at a temperature between 80 and 200° C. until its crystallisation is achieved, and in that the reaction mixture has a composition, in terms of molar ratios, lying in the intervals $ROH/SiO_2=0.1-1.0$
$F/SiO_2=0.1-2.0$
$H_2O/SiO_2=1-20$.

According to an additional preferred particular embodiment of the method, reaction mixture contains:

a source of $SiO_2$, a source of one or more triavalent elements X selected from among Al, B, Ga, Fe, Cr and mixtures of them, one or more sources of organic cation R, selected from between N,N,N',N'-tetramethyl-decahydro-cyclobuta [1,2-c; 3,4-c'] dipyrrolidinium and 4-cyclohexyl-1,1-dimethyl-piperazinium, a source of fluoride ions, and water is subjected to heating with or without stirring at a temperature between 80 and 200° C. until its crystallisation is achieved, and in that the reaction mixture has a composition, in terms of molar ratios, lying in the intervals $ROH/SiO_2=0.01-1.0$
$X_2O_3/SiO_2=0-0.1$, excluding the value 0
$F/SiO_2=0.1-3.0$ and
$H_2O/SiO_2=1-50$.

According to a preferred particular embodiment of the method, the reaction mixture contains:

a source of $SiO_2$, a source of one or other triavalent elements X selected from among Al, B, Ga, Fe, Cr and mixtures of them, one or more sources of organic cation R, selected from between N,N,N',N'-tetramethyl-decahydro-cyclobuta [1,2-c; 3,4-c'] dipyrrolidinium and 4-cyclohexyl-1,1-dimethyl-piperazinium, a source of fluoride ions, and water is subjected to heating with or without stirring at a temperature between 80 and 200° C. until its crystallisation is achieved, and in that the reaction mixture has a composition, in terms of molar ratios, lying in the intervals $ROH/SiO_2=0.1-1.0$
$X_2O_3/SiO_2=0-0.05$, excluding the value 0
$F/SiO_2=0.1-2.0$
$H_2O/SiO_2=1-20$.

According to a preferred additional particular embodiment of the method, the reaction mixture contains:

a source of $SiO_2$, a source of one or other tetravalent elements Y, different from Si, selected from among Ge, Ti, V, Sn and mixtures of them, one or more sources of organic cation R, selected from between N,N,N',N'-tetramethyl-decahydro-cyclobuta [1,2-c; 3,4-c'] dipyrrolidinium and 4-cyclohexyl-1,1-dimethyl-piperazinium, a source of fluoride ions, and water is subjected to heating with or without stirring at a temperature between 80 and 200° C. until its crystallisation is achieved, and in that the reaction mixture has a composition, in terms of molar ratios, lying in the intervals $ROH/SiO_2=0.01-1.0$
$YO_2/SiO_2=0-0.1$, excluding the value 0
$F/SiO_2=0.1-3.0$
$H_2O/SiO_2=1-50$.

According to a preferred particular embodiment of the method, the reaction mixture contains:

a source of $SiO_2$, a source of one or other tetravalent elements Y, different from Si, selected from among Ge, Ti, V, Sn and mixtures of them, one or more sources of organic cation R, selected from between N,N,N',N'-tetramethyl-decahydro-cyclobuta [1,2-c; 3,4-c'] dipyrrolidinium and 4-cyclohexyl-1,1-dimethyl-piperazinium, a source of fluoride ions, and water is subjected to heating with or without stirring at a temperature between 80 and 200° C. until its crystallisation is achieved, and in that the reaction mixture has a composition, in terms of molar ratios, lying in the intervals $ROH/SiO_2=0.1-1.0$,
$YO_2/SiO_2=0-0.05$, excluding the value 0
$F/SiO_2=0.1-2.0$
$H_2O/SiO_2=1-20$.

The composition of the reaction mixture giving rise to obtaining the material ITQ-32 can be represented in general by the following formula with the values of the parameters stated in terms of molar ratios:

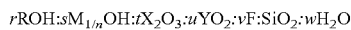

where M is one or more inorganic cations M of charge +n, preferably alkalines or alkaline-earths, X is one or more triavalent elements, preferably Al, B, Ga, Fe, Cr and mixtures of them; Y is one or more tetravalent elements different from Si, preferably Ge, Ti, Sn, V and mixtures of them; R is one or more organic cations, preferably N,N,N',N'-tetramethyl-decahydro-cyclobuta [1,2-c;3,4-c'] dipyrrolidinium and 4-cyclohexyl-1,1-dimethyl-piperazinium; F is one or more sources of fluoride ions, preferably HF, $NH_4F$ or a mixture of both, and the values of r, s, t, u, v and w vary in the intervals:

r=$ROH/SiO_2$=0.01-1.0, preferably 0.1-1.0 s=$M_{1/n}OH/SiO_2$=0-1.0, preferably 0-0.2 t=$X_2O_3/SiO_2$=0-0.1, preferably 0-0.05 u=$YO_2/SiO_2$=0-0.1, preferably 0-0.05 v=$F/SiO_2$=0.1-3.0, preferably 0.1-2.0 w=$H_2O/SiO_2$=1-50, preferably 1-20

The components of the synthesis mixture can come from different sources, and depending on them the crystallisation times and conditions can vary.

The heat treatment of the mixture is preferably done at a temperature of between 130 and 200° C. The heat treatment of the reaction mixture can be carried out statically or with stirring of the mixture. Once the crystallisation is completed, the solid product is separated out by filtration or centrifugation and is dried. Subsequent calcination at temperatures above 350° C., preferably between 400 and 1000° C., produces decomposition of the organic remains occluded inside the zeolite and their exit, leaving the zeolite channels free.

The source of $SiO_2$ can be, for example, tetraethylorthosilicate, colloidal silica, amorphous silica and mixtures of them.

The fluoride anion is used as mobilising agent for the precursor species. The source of fluoride ions is preferably HF, $NH_4F$ or a mixture of both.

The organic cation or cations, represented by R, is or are added to the reaction mixture preferably in the form of a salt, for example a halide, or in the form of hydroxide, and in addition a source of alkaline, alkaline-earths or a mixture of both (M) can be used in the form of a hydroxide or salt.

In a preferred manner, the organic cation R is N,N,N',N'-tetramethyl-decahydro-cyclobuta [1,2-c;3,4-c'] dipyrrolidinium and 4-cyclohexyl-1,1-dimethyl-piperazinium and is preferably added in a form selected between hydroxide, another salt or a mixture of hydroxide and another salt, preferably a halide.

The organic cation N,N,N',N'-tetramethyl-decahydro-cyclobuta [1,2-c;3,4-c'] dipyrrolidinium is synthesised following the process represented in the following diagram:

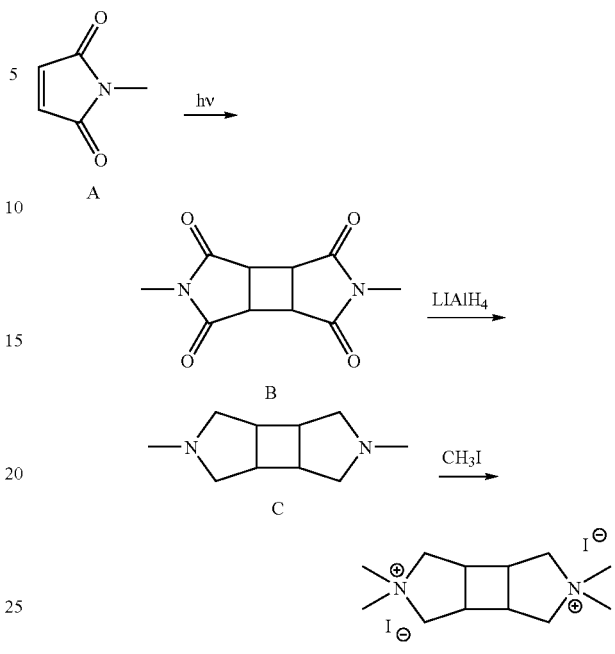

In this process a cycloaddition reaction is carried out of the N-methylmaleimide (product A) photochemically induced in order to give rise to the corresponding diimide (product B). The diimide is reduced with $LiAlH_4$ in order to be transformed into diamine (product C) and is then quaternised to give the iodide of N,N,N',N'-tetramethyl-decahydro-cyclobuta [1,2-c;3,4-c'] dipyrrolidinium (product D).

The organic cation 4-cyclohexyl-1,1-dimethyl-piperazinium is represented below and is obtained by alkylation of N-cyclohexylpiperazine with methyl iodide.

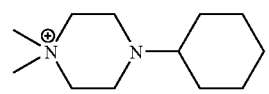

According to a particular embodiment of the method, a quantity of crystalline ITQ-32 material of the present invention is added to the reaction mixture as a promoter of the crystallisation by an amount between 0.01 and 20% by weight, preferably between 0.05 and 10% by weight, with respect to the total of inorganic oxides added.

Moreover, the material produced by means of this invention can be pelletised in accordance with known techniques, and can be used as a catalyst or component of catalysts in transformation processes of organic compounds, or as adsorbent in adsorption and separation process of organic compounds.

For use in the aforementioned processes, it is preferable for the ITQ-32 to be in its calcined form without any organic matter in its interior.

The ITQ-32 material used in these catalytic applications can be in its acid form and/or exchanged with suitable cations, such as H+ or an inorganic cation of charge +n, selected from among alkaline metals, alkaline-earths, lanthanides and combinations of them.

The ITQ-32 material used in adsorption/separation processes can be in its purely siliceous state, in other words, not containing any elements other than silicon and oxygen in its composition.

Figure 1:
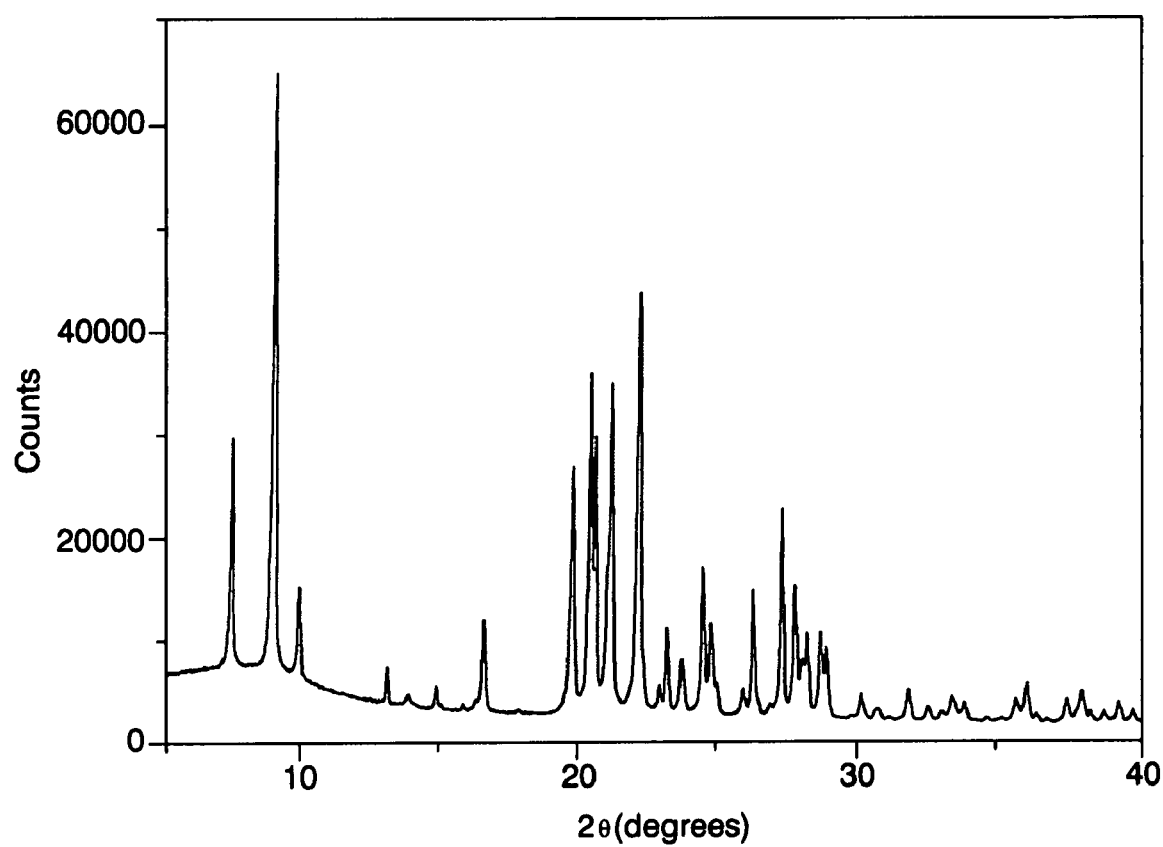
FIG. 1 represents the most characteristic peaks of the X-ray diffraction pattern of the ITQ-32 material, as synthesised, obtained according to example 3.
Figure 2:
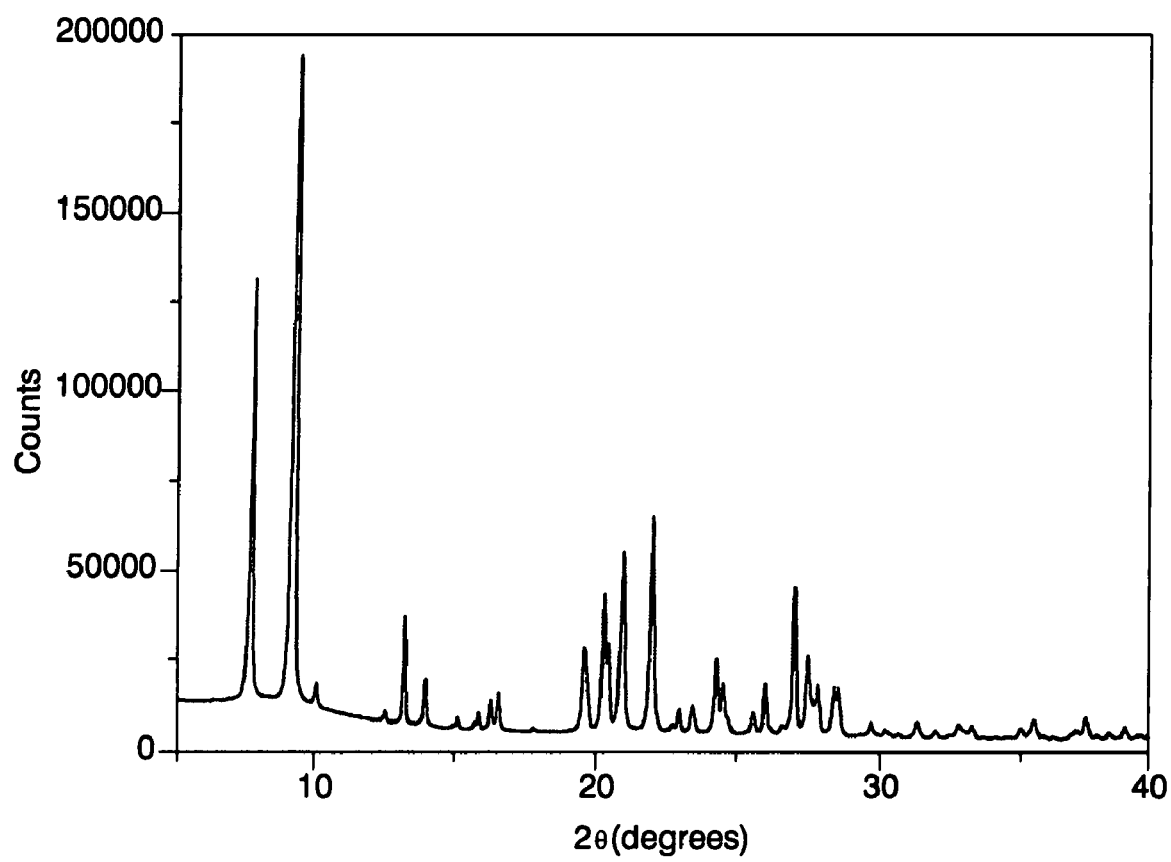
FIG. 2 represents the most characteristic peaks of the X-ray diffraction pattern of the material of example 3, in the calcined state.

The present invention is illustrated by means of the following examples.

EXAMPLES

Example 1

Preparation of N,N,N',N'-tetramethyl-decahydro-cyclobuta [1,2-c;3,4-c'] dipyrrolidinium dihyroxide The organic cation is prepared in the following manner: 2.0 g of N-methylmaleimide (18.0 mmol) is dissolved in 450 ml of $CH_3CN$ and is then divide among 10 pyrex test-tubes. The solution is bubbled with a stream of $N_2$ for periods of 15 min and then irradiated, with continuous stirring, with a high pressure Hg lamp (200<λ<900 mm) for 9 hours. After that time, the solutions are concentrated in vacuo in order to give the corresponding diimide quantitatively.

Reduction of the diimde. 11.8 g (53.2 mmol) of diimide is added to a suspension of 10.1 g (265.9 mmol) of $LiAlH_4$ in 300 ml of diethyl ether (anhydrous), cooled to 0° C., under an $N_2$ atmosphere. The resulting mixture is heated at reflux for 8 hours, then left with continuous stirring at room temperature overnight. The crude product obtained is introduced in an ice bath to which are slowly added 3 ml of $H_2O$, 5 ml of a solution of NaOH (15%), 3 ml of $H_2O$. After 30 min of continuous stirring at room temperature, the mixture is filtered, with the resulting filtrate being extracted with diethyl ether. The set of organic phases is dried over $Na_2SO_4$ and concentrated in vacuo to give 5.6 g (63%) of the corresponding diamine.

Quaternisation of the diamine. 80 ml (1285.4 mmol) of $CH_3I$ are added to a solution of 8.6 g (51.9 mmol) of the diamine in 70 ml of MeOH. The mixture is kept under continuous stirring at room temperature for 72 h, after which an equivalent quantity of $CH_3I$ is again added, and is again kept stirring for a further 72 h. After that time, it is concentrated in vacuo without reaching dryness, causing the precipitation by addition of diethyl ether. The precipitate is filtered in vacuo to give 20.8 g (89%) of the quaternary ammonium salt. The characterisation of this solid by means of element analysis and nuclear magnetic resonance of $^1H$ and of $^{13}C$ confirms that it is the iodide of the cation N,N,N',N'-tetramethyl-decahydro-cyclobuta [1,2-c;3,4-c'] dipyrrolidinium ($RI_2$).

The iodide of the cation is exchanged for hydroxide using an ion exchange resin in accordance with the following procedure: 20 g (44 mmol) of the iodide of the cation ($RI_2$) is dissolved in water. 89 g of Dowex SBR resin is added to the solution obtained and it is kept stirred until the following day. Afterwards, it is filtered, washed with distilled water and a solution of N,N,N',N'-tetramethyl-decahydro-cyclobuta [1,2-c;3,4-c'] dipyrrolidinium dihydroxide ($R(OH)_2$) is obtained which is titrated with HCl (aq.) using phenolphthalein as indicator, obtaining an efficiency in the exchange of higher than 90%. The final solution contains 0.47 equivalents of hydroxide per 1000 g of solution.

Example 2

Preparation of 4-cyclohexyl-1,1-dimethyl-piperazinium 15 g (89 mmol) of N-cyclohexylpiperazine and 12.3 g of $K_2CO_3$ (89 mmol) are added to a round bottom flask and dissolved in approximately 300 ml of acetone. 51 g (359 mmol) of methyl iodide are then slowly added and stirred at room temperature for 24 h. After that time, the solvent is eliminated in a rotavapor and diethyl ether is added. The solid obtained is subjected to extraction in soxhlet overnight using chloroform as solvent. The suspension obtained is concentrated in a rotavapor and the precipitation of the salt is provoked by the addition of diethyl ether. The solid is collected by filtration, thoroughly washed with diethyl ether and dried in vacuo. The yield of the process is higher than 90%. The characterisation of this solid by means of element analysis and nuclear magnetic resonance of $^1H$ and of $^{13}C$ confirms that it is the iodide of the cation 4-cyclohexyl-1,1-dimethyl-piperazinium (R'I).

The iodide of the cation is exchanged for hydroxide using an ion exchange resin in accordance with the following procedure: 20 g (62 mmol) of the iodide of the cation (R'I) is dissolved in water. 62 g of Dowex SBR resin is added to the solution obtained and it is kept under stirring until the following day. Afterwards, it is filtered, washed with distilled water and a solution of 4-cyclohexyl-1,1-dimethyl-piperazinium hydroxide (R'OH) is obtained which is titrated with HCl (aq.) using phenolphthalein as indicator, obtaining an efficiency in the exchange of higher than 90%. The final solution contains 1 equivalent of hydroxide per 1000 g of solution.

Example 3

Preparation of Zeolite ITQ-32

0.081 g of Al isopropoxide are added to 4.13 g of tetraethylorthosilicate (TEOS). 21.51 g of a solution of N,N,N',N'-tetramethyl-decahydro-cyclobuta [1,2-c;3,4-c'] dipyrrolidinium dihydroxide ($R(OH)_2$), containing 0.47 equivalents of hydroxide in 1000 g. The mixture is left to evaporate with stirring until complete elimination of the ethanol coming from the hydrolysis of the TEOS plus the quantity of water necessary for achieving the final composition that is stated. Finally, 0.40 g of a solution of hydrofluoric acid (50% of HF by weight) is added. The composition of the gel is:

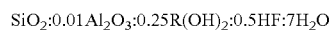

$SiO_2:0.01Al_2O_3:0.25R(OH)_2:0.5HF:7H_2O$

The mixture obtained is introduced in an autoclave provided with an internal lining of polytetrafluoroethylene and is heated at 175° C. for 14 days in a stove provided with a system of rotation. The X-ray diffractogram of the solid obtained when filtered, washed with distilled water and dried at 100° C. is shown in FIG. 1 and presents the list of most characteristic peaks appearing in table III. Calcination at 580° C. in air for 3 hours allows occluded organic species to be eliminated. The X-ray diffraction pattern of calcined zeolite ITQ-32 is shown

Example 4

Preparation of Zeolite ITQ-32

0.196 g of Al isopropoxide are added to 4 g of tetraethylorthosilicate (TEOS). 21.44 g of a solution of N,N,N',N'-tetramethyl-decahydro-cyclobuta [1,2-c;3,4-c'] dipyrrolidinium hydroxide (R(OH)$_2$), containing 0.47 equivalents of hydroxide in 1000 g. The mixture is left to evaporate with stirring until complete elimination of the ethanol coming from the hydrolysis of the TEOS plus the quantity of water necessary for achieving the final composition that is stated. Finally, 0.40 g of a solution of hydrofluoric acid (50% of HF by weight) is added. The composition of the gel is:

$SiO_2:0.025Al_2O_3:0.26R(OH)_2:0.52HF:7H_2O$

The mixture obtained is introduced in an autoclave provided with an internal lining of polytetrafluoroethylene and is heated at 175° C. for 20 days in a stove provided with a system of rotation. The solid obtained when filtered, washed with distilled water and dried at 100° C. is ITQ-32.

Example 5

Preparation of Zeolite ITQ-32

0.151 g of Al isopropoxide are added to 7.88 g of tetraethylorthosilicate (TEOS). 20.08 g of a solution of 4-cyclohexyl-1,1-dimethyl-piperazinium hydroxide (R'(OH)), containing 1 equivalent of hydroxide in 1000 g. The mixture is left to evaporate with stirring until complete elimination of the ethanol coming from the hydrolysis of the TEOS plus the quantity of water necessary for achieving the final composition that is stated. Finally, 0.80 g of a solution of hydrofluoric acid (50% of HF by weight) is added. The composition of the gel is:

$SiO_2:0.01Al_2O_3:0.54R'(OH):0.54HF:7H_2O$

The mixture obtained is introduced in an autoclave provided with an internal lining of polytetrafluoroethylene and is heated at 175° C. for 6 days in a stove provided with a system of rotation. The solid obtained when filtered, washed with distilled water and dried at 100° C. is ITQ-32.

Example 6

Preparation of Zeolite ITQ-32

7.86 g of tetraethylorthosilicate (TEOS) are added to 20 g of a solution of 4-cyclohexyl-1,1-dimethyl-piperazinium hydroxide (R'OH), containing 1 equivalent of hydroxide in 1000 g. The mixture is left to evaporate with stirring until complete elimination of the ethanol coming from the hydrolysis of the TEOS plus the quantity of water necessary for achieving the final composition that is stated. Finally, 0.80 g of a solution of hydrofluoric acid (50% of HF by weight) and a suspension of 0.22 g of zeolite ITQ-32 prepared as described in example 5 are added. The composition of the gel is:

$SiO_2:0.54R'(OH):0.54HF:7H_2O$

The mixture obtained is introduced in an autoclave provided with an internal lining of polytetrafluoroethylene and is heated at 175° C. for 2 days in a stove provided with a system of rotation. The solid obtained when filtered, washed with distilled water and dried at 100° C. is ITQ-32.

Example 7

Preparation of Zeolite ITQ-32

0.099 g of Al isopropoxide and 0.055 g of Ti (IV) tetraethoxide (TiTEO) are added to 5 g of tetraethylorthosilicate (TEOS). 16.94 g of a solution of N,N,N',N'-tetramethyl-decahydro-cyclobuta [1,2-c;3,4-c'] dipyrrolidinium dihydroxide (R(OH)$_2$), containing 0.73 equivalents of hydroxide in 1000 g. The mixture is left to evaporate with stirring until complete elimination of the ethanol coming from the hydrolysis of the TEOS and TiTEO plus the quantity of water necessary for achieving the final composition that is stated. Finally, 0.49 g of a solution of hydrofluoric acid (50% of HF by weight) is added. The composition of the gel is:

$SiO_2:0.01Al_2O_3:0.01TiO_2:0.26R(OH)_2:0.52HF:7H_2O$

The mixture obtained is introduced in an autoclave provided with an internal lining of polytetrafluoroethylene and is heated at 175° C. for 14 days in a stove provided with a system of rotation. The solid obtained when filtered, washed with distilled water and dried at 100° C. is ITQ-32.

Example 8

Preparation of Zeolite ITQ-32

4 g of tetraethylorthosilicate (TEOS) are added to 18.14 g of a solution of N,N,N',N'-tetramethyl-decahydro-cyclobuta [1,2-c;3,4-c'] dipyrrolidinium hydroxide (R(OH)$_2$), containing 0.54 equivalents of hydroxide in 1000 g. A solution is then added consisting of 0.17 g of Ga(NO$_3$)$_3$.10H$_2$O and 1 g of water. The mixture is left to evaporate with stirring until complete elimination of the ethanol coming from the hydrolysis of the TEOS plus the quantity of water necessary for achieving the final composition that is stated. Finally, 0.39 g of a solution of hydrofluoric acid (50% of HF by weight) is added. The composition of the gel is:

$SiO_2:0.01Ga_2O_3:0.25R(OH)_2:0.5HF:7H_2O$

The mixture obtained is introduced in an autoclave provided with an internal lining of polytetrafluoroethylene and is heated at 175° C. for 16 days in a stove provided with a system of rotation. The solid obtained when filtered, washed with distilled water and dried at 100° C. is ITQ-32.

Example 9

Preparation of Zeolite ITQ-32

4 g of tetraethylorthosilicate (TEOS) are added to 15.27 g of a solution of N,N,N',N'-tetramethyl-decahydro-cyclobuta [1,2-c;3,4-c'] dipyrrolidinium dihydroxide (R(OH)$_2$), containing 0.66 equivalents of hydroxide in 1000 g. 0.059 g of H$_3$BO$_3$ is then added and the mixture is left to evaporate with stirring until complete elimination of the ethanol coming from the hydrolysis of the TEOS plus the quantity of water necessary for achieving the final composition that is stated. Finally, 0.40 g of a solution of hydrofluoric acid (50% of HF by weight) is added. The composition of the gel is:

$SiO_2:0.025B_2O_3:0.26R(OH)_2:0.52HF:7H_2O$

The mixture obtained is introduced in an autoclave provided with an internal lining of polytetrafluoroethylene and is heated at 175° C. for 24 days in a stove provided with a system of rotation. The solid obtained when filtered, washed with distilled water and dried at 100° C. is ITQ-32.

The invention claimed is:

1. A microporous crystalline zeolite material having, in the calcined state and in the absence of defects in the crystal lattice thereof, manifested by the presence of silanols, an empirical formula $$x(M_{1/n}XO_2):yYO_2:SiO_2,$$

in which
M is selected from among H⁺, at least one inorganic cation with charge +n and a mixture of both;
X is at least one chemical element in oxidation state +3;
Y is at least one chemical element in oxidation state +4, which is different from Si,
x takes a value of between 0 and 0.2 inclusive,
y takes a value of between 0 and 0.1 inclusive,
and in that the material, as it is synthesised, has an X-ray diffraction pattern with at least the values of angle 2θ (degrees) and relative intensities (I/I₀):

| 2θ (degrees) ± 0.5 | Intensity (I/I₀) |
|---|---|
| 7.3 | s |
| 8.8 | vs |
| 9.7 | w |
| 16.4 | w |
| 19.6 | s |
| 20.2 | s |
| 21.0 | s |
| 21.9 | s |
| 24.2 | m |
| 26.0 | m |
| 27.0 | m |
| 27.5 | m | where I₀ is the intensity of the strongest peak which is assigned a value of 100
w is a weak relative intensity of between 0 and 20%,
m is a medium relative intensity of between 20 and 40%,
s is a strong relative intensity of between 40 and 60%,
vs is a very strong relative intensity of between 60 and 100%.

2. A microporous crystalline zeolite material according to claim 1, having, in the calcined state, an X-ray diffraction pattern with at least the values of angle 2θ (degrees) and relative intensities (I/I₀):

| 2θ (degrees) ± 0.5 | Intensity (I/I₀) |
|---|---|
| 7.4 | vs |
| 8.9 | vs |
| 9.7 | w |
| 12.9 | w |
| 19.3 | w |
| 20.3 | m |
| 20.9 | m |
| 22.0 | m |
| 24.3 | w |
| 26.0 | w |
| 27.1 | m |
| 27.6 | w | where
w is a weak relative intensity of between 0 and 20%,
m is a medium relative intensity of between 20 and 40%,
s is a strong relative intensity of between 40 and 60%,
vs is a very strong relative intensity of between 60 and 100%.

3. A microporous crystalline zeolite material according to claim 1, wherein X is selected from among Al, Ga, B, Fe, Cr and mixtures of them.

4. A microporous crystalline zeolite material according to claim 1, wherein Y is selected from among Ge, Ti, Sn, V and mixtures of them.

5. A microporous crystalline zeolite material according to claim 1, wherein "x" takes a value of less than 0.1.

6. A microporous crystalline zeolite material according to claim 1, wherein "y" takes a value of less than 0.05.

7. A microporous crystalline zeolite material according to claim 1, having, in the calcined state and in the absence of defects in the crystalline lattice thereof, manifested by the presence of silanols, an empirical formula $$x(M_{1/n}XO_2):yYO_2:SiO_2$$

in which
M is selected from among H⁺, at least one inorganic cation with charge +n, preferably alkalines or alkaline-earths, alkaline metals, alkaline-earths and combination of them,
X is at least one chemical element in oxidation state +3 selected from among Al, Ga, B, Fe, Cr and mixtures of them;
Y is at least one chemical element in oxidation state +4, different from Si, selected from among Ge, Ti, Sn, V and mixtures of them,
x takes a value of between 0 and 0.1 inclusive,
y takes a value of between 0 and 0.05 inclusive,
and in that the material, as it is synthesised, has an X-ray diffraction pattern with at least the values of angle 2θ (degrees) and relative intensities (I/I₀):

| 2θ (degrees) ± 0.5 | Intensity (I/I₀) |
|---|---|
| 7.3 | s |
| 8.8 | vs |
| 9.7 | w |
| 16.4 | w |
| 19.6 | s |
| 20.2 | s |
| 21.0 | s |
| 21.9 | s |
| 24.2 | m |
| 26.0 | m |
| 27.0 | m |
| 27.5 | m | and said material in the calcined state has an X-ray diffraction pattern with at least the values of angle 2θ (degrees) and relative intensities (I/I₀):

| 2θ (degrees) ± 0.5 | Intensity (I/I₀) |
|---|---|
| 7.4 | vs |
| 8.9 | vs |
| 9.7 | w |
| 12.9 | w |
| 19.5 | w |
| 20.3 | m |

-continued

| 2θ (degrees) ± 0.5 | Intensity (I/I₀) |
|---|---|
| 20.9 | m |
| 22.0 | m |
| 24.3 | w |
| 26.0 | w |
| 27.1 | m |
| 27.6 | w | where w, m, s, and vs has the above meaning stated in claim 1.

8. A microporous crystalline zeolite material according to claim 1, wherein "x" is 0 and "y" is 0.

9. A microporous crystalline zeolite material according to claim 1, wherein
X is Al or B, and
y takes the value 0.

10. A microporous crystalline zeolite material according to claim 1, wherein
Y is Ti or Sn, and
x takes the value 0.

11. A microporous crystalline zeolite material according to claim 1, wherein
X is Al or B and
Y is Ti or Sn.

12. A method for synthesising the microporous crystalline zeolite material of claim 1 wherein a reaction mixture containing at least:
one or more sources of $SiO_2$,
one or more sources of organic cation R,
one or more sources of fluoride ions, and
water
is subjected to heating at a temperature between 80 and 200° C. until its crystallisation is achieved, and wherein the reaction mixture has a composition, in terms of molar ratios, lying in the intervals
$ROH/SiO_2$=0.01-1.0,
$F/SiO_2$=0.1-3.0,
$H_2O/SiO_2$=1-50.

13. A method for synthesising the microporous crystalline material of claim 1 wherein a reaction mixture containing exclusively:
one or more sources of $SiO_2$,
one or more sources of organic cation R,
one or more sources of fluoride ions, and
water
is subjected to heating at a temperature between 80 and 200° C. until its crystallisation is achieved, and wherein the reaction mixture has a composition, in terms of molar ratios, lying in the intervals
$ROH/SiO_2$=0.01-1.0,
$F/SiO_2$=0.1-3.0, and
$H_2O/SiO_2$=1-50.

14. A method according to claim 12, wherein the reaction mixture furthermore contains:
a source of one or more trivalent elements X,
and wherein the reaction mixture has a composition, in terms of molar ratios, lying in the intervals
$ROH/SiO_2$=0.01-1.0,
$X_2O_3/SiO_2$=0-0.1, excluding the value 0
$F/SiO_2$=0.1-3.0, and
$H_2O/SiO_2$=1-50.

15. A method according to claim 12, wherein the reaction mixture furthermore contains:
a source of one or more tetravalent elements Y, different from Si,
and wherein the reaction mixture has a composition, in terms of molar ratios, lying in the intervals
$ROH/SiO_2$=0.01-1.0,
$YO_2/SiO_2$=0-0.1, excluding the value 0
$F/SiO_2$=0.1-3.0, and
$H_2O/SiO_2$=1-50.

16. A method according to claim 12, wherein the reaction mixture furthermore contains:
a source of one or more tetravalent elements Y different from Si,
a source of one or more trivalent elements X,
and wherein the reaction mixture has a composition, in terms of molar ratios, lying in the intervals
$ROH/SiO_2$=0.01-1.0,
$X_2O_3/SiO_2$=0-0.1, excluding the value 0
$YO_2/SiO_2$=0-0.1, excluding the value 0
$F/SiO_2$=0.1-3.0, and
$H_2O/SiO_2$=1-50.

17. A method according to claim 12, wherein the reaction mixture contains:
a source of $SiO_2$,
a source of one or other tetravalent elements Y, different from Si, selected from among Ge, Ti, V, Sn and mixtures of them,
a source of one or other triavalent elements X selected from among Al, B, Ga, Fe, Cr and mixtures of them,
a source of inorganic cations M of charge +n,
one or more sources of organic cation R, selected from between N,N,N',N'-tetramethyl-decahydro-cyclobuta [1,2-c;3,4-c'] dipyrrolidinium and 4-cyclohexyl-1,1-dimethyl-piperazinium,
a source of fluoride ions, and
water
and wherein the mixture is subjected to heating with or without stirring at a temperature between 80 and 200° C. until its crystallisation is achieved, and the reaction mixture has a composition, in terms of molar ratios, lying in the intervals
$ROH/SiO_2$=0.01-1.0,
$M_{1/n}OH/SiO_2$=0-1.0, excluding the value 0,
$X_2O_3/SiO_2$=0-0.1, excluding the value 0,
$Y_2O_2/SiO_2$=0-0.1, excluding the value 0,
$F/SiO_2$=0.1-3.0,
$H_2O/SiO_2$=1-50.

18. A method according to claim 12, wherein the reaction mixture contains:
a source of $SiO_2$,
a source of one or other tetravalent elements Y, different from Si, selected from among Ge, Ti, V, Sn and mixtures of them,
a source of one or other triavalent elements X selected from among Al, B, Ga, Fe, Cr and mixtures of them,
one or more sources of organic cation R, selected from between N,N,N',N'-tetramethyl-decahydro-cyclobuta [1,2-c;3,4-c'] dipyrrolidinium and 4-cyclohexyl-1,1-dimethyl-piperazinium,
a source of fluoride ions, and
water
and wherein the mixture is subjected to heating with or without stirring at a temperature between 80 and 200° C. until its crystallisation is achieved, and the reaction mixture has a composition, in terms of molar ratios, lying in the intervals
ROH/SiO$_2$=0.1-1.0,
X$_2$O$_3$/SiO$_2$=0-0.05, excluding the value 0,
YO$_2$/SiO$_2$=0-0.05, excluding the value 0,
F/SiO$_2$=0.1-2.0 and
H$_2$O/SiO$_2$=1-20.

19. A method according to claim 12, wherein the reaction mixture contains a source of SiO$_2$,
one or more sources of organic cation R, selected from between N,N,N',N'-tetramethyl-decahydro-cyclobuta[1,2-c;3,4-c'] dipyrrolidinium and 4-cyclohexyl-1,1-dimethyl-piperazinium,
a source of fluoride ions, and
water
wherein the mixture is subjected to heating with or without stirring at a temperature between 80 and 200° C. until its crystallisation is achieved, and the reaction mixture has a composition, in terms of molar ratios, lying in the intervals
ROH/SiO$_2$=0.01-1.0,
F/SiO$_2$=0.1-3.0 and
H$_2$O/SiO$_2$=1-50.

20. A method according to claim 12, wherein the reaction mixture contains
a source of SiO$_2$,
one or more sources of organic cation R, selected from between N,N,N',N'-tetramethyl-decahydro-cyclobuta[1,2-c;3,4-c'] dipyrrolidinium and 4-cyclohexyl-1,1-dimethyl-piperazinium,
a source of fluoride ions, and
water
wherein the mixture is subjected to heating with or without stirring at a temperature between 80 and 200° C. until its crystallisation is achieved, and the reaction mixture has a composition, in terms of molar ratios, lying in the intervals
ROH/SiO$_2$=0.1-1.0,
F/SiO$_2$=0.1-2.0 and
H$_2$O/SiO$_2$=1-20.

21. A method according to claim 12, wherein the reaction mixture contains
a source of SiO$_2$,
a source of one or more trivalent elements X selected from among Al, B, Ga, Fe, Cr and mixtures of them,
one or more sources of organic cation R, selected from between N,N,N',N'-tetramethyl-decahydro-cyclobuta[1,2-c;3,4-c'] dipyrrolidinium and 4-cyclohexyl-1,1-dimethyl-piperazinium,
a source of fluoride ions, and
water
and wherein the mixture is subjected to heating with or without stirring at a temperature between 80 and 200° C. until its crystallisation is achieved, and the reaction mixture has a composition, in terms of molar ratios, lying in the intervals
ROH/SiO$_2$=0.01-1.0
X$_2$O$_3$/SiO$_2$=0-0.1, excluding the value 0
F/SiO$_2$=0.1-3.0
H$_2$O/SiO$_2$=1-50.

22. A method according to claim 12, wherein the reaction mixture contains
a source of SiO$_2$,
a source of one or other trivalent elements X selected from among Al, B, Ga, Fe, Cr and mixtures of them,
one or more sources of organic cation R, selected from between N,N,N',N'-tetramethyl-decahydro-cyclobuta[1,2-c;3,4-c'] dipyrrolidinium and 4-cyclohexyl-1,1-dimethyl-piperazinium,
a source of fluoride ions, and
water
wherein the mixture is subjected to heating with or without stirring at a temperature between 80 and 200° C. until its crystallisation is achieved, and the reaction mixture has a composition, in terms of molar ratios, lying in the intervals
ROH/SiO$_2$=0.1-1.0,
X$_2$O$_3$/SiO$_2$=0-0.05, excluding the value 0
F/SiO$_2$=0.1-2.0
H$_2$O/SiO$_2$=1-20.

23. A method according to claim 12, wherein the reaction mixture contains
a source of SiO$_2$,
a source of one or other tetravalent elements Y, different from Si, selected from among Ge, Ti, V, Sn and mixtures of them,
one or more sources of organic cation R, selected from between N,N,N',N'-tetramethyl-decahydro-cyclobuta[1,2-c;3,4-c'] dipyrrolidinium and 4-cyclohexyl-1,1-dimethyl-piperazinium,
a source of fluoride ions, and
water
wherein the mixture is subjected to heating with or without stirring at a temperature between 80 and 200° C. until its crystallisation is achieved, and the reaction mixture has a composition, in terms of molar ratios, lying in the intervals
ROH/SiO$_2$=0.01-1.0
YO$_2$/SiO$_2$=0-0.1, excluding the value 0
F/SiO$_2$=0.1-3.0
H$_2$O/SiO$_2$=1-50.

24. A method according to claim 12, wherein the reaction mixture contains
a source of SiO$_2$,
a source of one or other tetravalent elements Y, different from Si, selected from among Ge, Ti, V, Sn and mixtures of them,
one or more sources of organic cation R, selected from between N,N,N',N'-tetramethyl-decahydro-cyclobuta[1,2-c;3,4-c'] dipyrrolidinium and 4-cyclohexyl-1,1-dimethyl-piperazinium,
a source of fluoride ions, and
water
wherein the mixture is subjected to heating with or without stirring at a temperature between 80 and 200° C. until its crystallisation is achieved, and the reaction mixture has a composition, in terms of molar ratios, lying in the intervals
ROH/SiO$_2$=0.1-1.0,
YO$_2$/SiO$_2$=0-0.05, excluding the value 0
F/SiO$_2$=0.1-2.0
H$_2$O/SiO$_2$=1-20.

25. A method according to claim 12, wherein the organic cation R is N,N,N',N'-tetramethyl-decahydro-cyclobuta[1,2-c;3,4-c'] dipyrrolidinium or 4-cyclohexyl-1,1-dimethyl-piperazinium and is added in the form selected from between hydroxide, another salt or a mixture of hydroxide and another salt.

26. A method according to claim 12, wherein a quantity of the microporous crystalline material is added to the reaction mixture as a promoter of the crystallisation, in an amount between 0.01 and 20% by weight with respect to the total of inorganic oxides added.

27. A method according to claim 12, wherein a quantity of the microporous crystalline material is added to the reaction mixture as a promoter of the crystallisation, in an amount between 0.05 and 10% by weight with respect to the total of inorganic oxides added.

28. Method for transformation of organic compounds which comprises employing the microporous crystalline zeolite material of claim 2 as catalyst or component of catalyst.

29. Method for separation of organic compounds which comprises employing the microporous crystalline zeolite material of claim 2 therefor.

30. Method for adsorption of organic compounds which comprises employing the microporous crystalline zeolite material of claim 2 as adsorbent.

31. Method according to claim 28 wherein said microporous crystalline zeolite material is in a form selected from among acid form, exchanged with cations selected from between $H^+$ and/or an inorganic cation of charge +n, selected from among alkaline metals, alkaline-earths, lanthanides and combinations of them, and mixture of both.

32. Method according to claim 29 wherein said microporous crystalline zeolite material is in a form selected from among acid form, exchanged with cations selected from between $H^+$ and/or an inorganic cation of charge +n, selected from among alkaline metals, alkaline-earths, lanthanides and combinations of them, and mixture of both.

33. Method according to claim 30 wherein said microporous crystalline zeolite material is in a form selected from among acid form, exchanged with cations selected from between $H^+$ and/or an inorganic cation of charge +n, selected from among alkaline metals, alkaline-earths, lanthanides and combinations of them, and mixture of both.

* * * * *